US008570317B2

(12) United States Patent
Kuriaki

(10) Patent No.: US 8,570,317 B2
(45) Date of Patent: Oct. 29, 2013

(54) IMAGE DISPLAY DEVICE

(75) Inventor: Makoto Kuriaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 404 days.

(21) Appl. No.: 13/029,651

(22) Filed: Feb. 17, 2011

(65) Prior Publication Data

US 2011/0221714 A1 Sep. 15, 2011

(30) Foreign Application Priority Data

Mar. 15, 2010 (JP) ................................ 2010-057644

(51) Int. Cl.
*G06F 3/033* (2013.01)
*G09G 5/00* (2006.01)

(52) U.S. Cl.
USPC .............................................. 345/214; 62/3.2

(58) Field of Classification Search
None
See application file for complete search history.

(56) References Cited

U.S. PATENT DOCUMENTS

| | | | | |
|---|---|---|---|---|
| 5,521,375 | A * | 5/1996 | Jang | 250/238 |
| 5,626,021 | A * | 5/1997 | Karunasiri et al. | 62/3.5 |
| 6,055,815 | A * | 5/2000 | Peterson | 62/3.7 |
| 6,491,420 | B1 * | 12/2002 | Scifres | 362/553 |
| 2003/0033819 | A1 * | 2/2003 | Prescott | 62/3.7 |
| 2003/0067949 | A1 * | 4/2003 | Nasu et al. | 372/32 |
| 2003/0081128 | A1 * | 5/2003 | Kirmuss | 348/207.99 |
| 2003/0133482 | A1 * | 7/2003 | Yoshida et al. | 372/43 |
| 2007/0103646 | A1 * | 5/2007 | Young | 353/52 |
| 2007/0153848 | A1 * | 7/2007 | Fratti et al. | 372/36 |
| 2008/0042578 | A1 * | 2/2008 | Arai et al. | 315/32 |
| 2008/0084171 | A1 * | 4/2008 | Leehey et al. | 318/34 |
| 2008/0165814 | A1 * | 7/2008 | Iehisa | 372/29.011 |
| 2009/0141757 | A1 * | 6/2009 | Parker et al. | 372/34 |
| 2009/0175303 | A1 * | 7/2009 | Zhang et al. | 372/26 |
| 2009/0288424 | A1 * | 11/2009 | Leblond | 62/3.3 |
| 2010/0066649 | A1 * | 3/2010 | Furuya et al. | 345/55 |

FOREIGN PATENT DOCUMENTS

| | | |
|---|---|---|
| JP | 10-335724 A | 12/1998 |

* cited by examiner

*Primary Examiner* — James Wozniak
*Assistant Examiner* — Antonio Xavier
(74) *Attorney, Agent, or Firm* — Birch, Stewart, Kolasch & Birch, LLP

(57) ABSTRACT

There is provided an image display device including: a laser element that generates light for projecting and displaying an image on a display screen; a Peltier device unit that cools the laser element; a detecting unit that detects a temperature of the laser element; and a control unit that controls driving of the Peltier device unit so that a temperature detected by the detecting unit becomes a target temperature, wherein the control unit controls driving of the laser element to reduce a light output of the laser element when a driving rate of the Peltier device unit exceeds a threshold that indicates that the driving rate approaches a maximum value.

2 Claims, 3 Drawing Sheets

IMAGE DISPLAY DEVICE

BACKGROUND OF THE INVENTION

1. Field of the Invention

The present invention relates to an image display device.

2. Description of the Related Art

According to laser elements serving as a light source for projecting and displaying images in projection televisions, output characteristics and the life of the laser element used (a semiconductor laser element) are influenced largely by its operating temperature. Therefore, the temperature needs to be managed to stabilize an output. The projection television includes a cooling device that cools the laser element for maintaining the operating temperature thereof to be constant.

Japanese Patent Application Laid-open No. H10-335724 describes that, in a temperature control circuit of a semiconductor laser, a current flows in a Peltier device for cooling or heating the semiconductor laser based on a temperature of the semiconductor laser detected by a thermistor.

However, Japanese Patent Application Laid-open No. H10-335724 does not describe what control is performed when an environmental temperature is higher than expected or when the Peltier device has some failures and thus its cooling capacity is reduced.

Meanwhile, the projection television (image display device) sometimes includes a heat pipe, a radiating radiator, and a fan in a Peltier device unit for radiation. In this case, depending on an actual usage environment, a sufficient air path for the fan cannot be ensured or the radiator and the fan are clogged with dust, thus the amount of heat cooled by the Peltier device unit may be reduced. That is, the cooling capacity of the Peltier device unit is reduced and the temperature of the laser element may not be controlled to a target temperature. When the laser element continues to be used at a high temperature exceeding the target temperature, the laser element is broken or its life is shortened.

SUMMARY OF THE INVENTION

It is an object of the present invention to at least partially solve the problems in the conventional technology.

According to an aspect of the present invention, there is provided an image display device including: a laser element that generates light for projecting and displaying an image on a display screen; a Peltier device unit that cools the laser element; a detecting unit that detects a temperature of the laser element; and a control unit that controls driving of the Peltier device unit so that a temperature detected by the detecting unit becomes a target temperature, wherein the control unit controls driving of the laser element to reduce a light output of the laser element when a driving rate of the Peltier device unit exceeds a threshold that indicates that the driving rate approaches a maximum value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image display device according to the present invention will be explained below in detail with reference to the accompanying drawings. The present invention is not limited to the embodiments.

Figure 1:
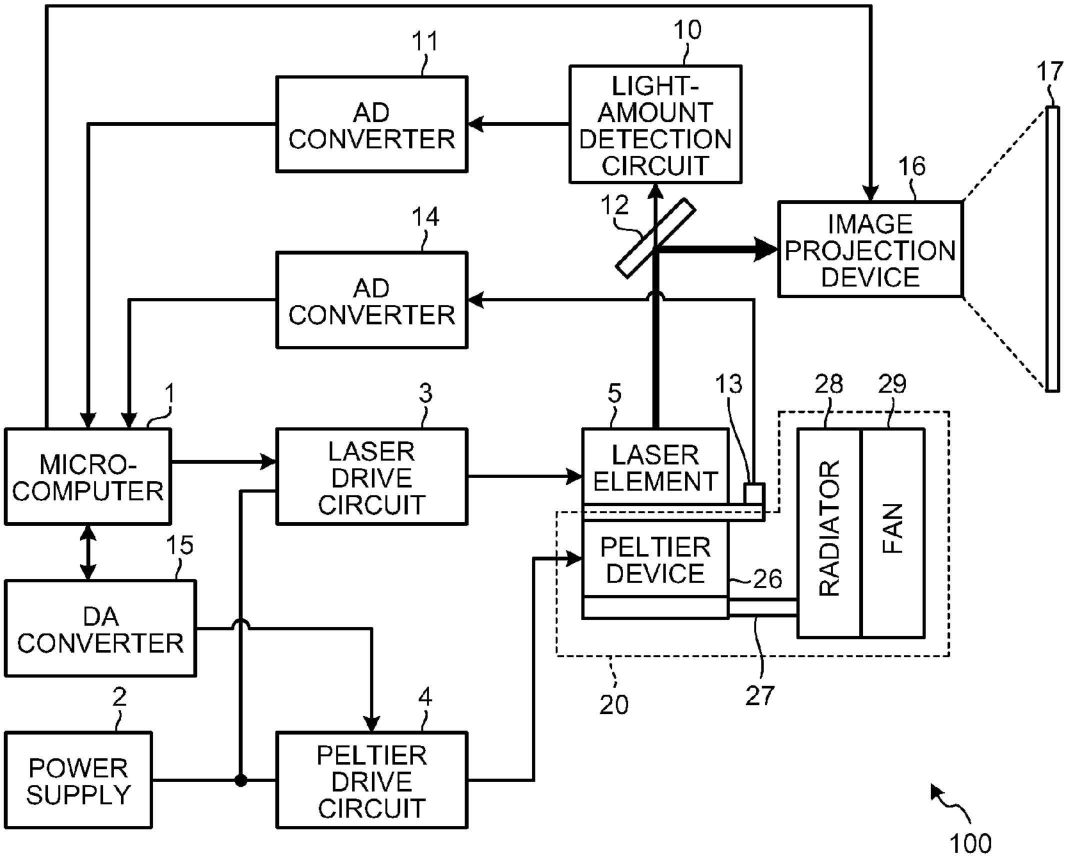
FIG. 1 depicts a configuration of an image display device according to an embodiment of the present invention.

A configuration of an image display device 100 according to an embodiment of the present invention is explained with reference to FIG. 1.

The image display device 100 includes a laser element 5, an image projection device (projection display unit) 16, a screen (display screen) 17, a Peltier device unit 20, a light-amount detection circuit (second detecting unit) 10, an Analog-Digital (AD) converter 11, a microcomputer 1, a laser drive circuit 3, a power supply 2, a temperature detection circuit (detecting unit) 13, a Digital-Analog (DA) converter 15, and a Peltier drive circuit 4.

The laser element 5 generates light for projecting and displaying images on the screen 17. That is, in the image display device 100, a part of light emitted from the laser element 5 is reflected by a half mirror 12 to be projected on the screen 17 as an image through an image modulation device (not shown) and an optical device (not shown) in the image projection device 16. A projected image (for example, a moving image) is displayed on the screen 17. For example, a semiconductor laser element is used for the laser element 5.

The Peltier device unit 20 cools the laser element 5. The Peltier device unit 20 includes a Peltier device 26, a heat pipe 27, a radiator 28, and a fan 29. A heat absorbing surface of the Peltier device 26 is placed on a side in which the laser element 5 is provided and a radiation surface thereof is placed on a side in which the heat pipe 27 is provided, so that the laser element 5 is cooled. Heat discharged from the radiation surface of the Peltier device 26 is transferred to a coolant circulating through the radiator 28 via the heat pipe 27. The fan 29 blows cooling air to the radiator 28, so that the coolant flowing in the radiator 28 is cooled and the heat transferred to the coolant is discharged outside the image display device 100.

In the image display device 100, another part of the light emitted from the laser element 5 transmits through the half mirror 12 to reach the light-amount detection circuit 10. The light-amount detection circuit 10 detects a light output of the laser element 5 using a received amount of light (for example, by multiplying it by a proportional coefficient). The light output is a value that indicates what percentage currently emitted light power occupies a maximum value of the light power emitted from the laser element 5, which is assumed to be 100%. The light-amount detection circuit 10 supplies a light output signal (analog signal) that indicates detected light output to the AD converter 11. The AD converter 11 AD-converts the light output signal (analog signal) into light output data (digital signal) and supplies resultant data to the microcomputer 1.

The microcomputer 1 compares the light output, which is indicated by the light output data, with a target light output and determines a driving amount of the laser element 5, so that a difference between the light output indicated by the light output data and the target light output is small. The microcomputer 1 supplies a control signal that indicates a determined driving amount to the laser drive circuit 3. The laser drive circuit 3 receives predetermined power from the power supply 2. The laser drive circuit 3 drives, as a DC-DC converter, the laser element 5 with a driving amount (driving power) indicated by the control signal, of the predetermined power received from the power supply 2. With this configuration, the microcomputer 1 feedback-controls driving of the laser element 5 so that the light output of the laser element 5 detected by the light-amount detection circuit 10 be the target light output.

The temperature detection circuit 13 detects a temperature of the laser element 5. The temperature detection circuit 13 supplies a temperature signal (analog signal) that indicates the detected temperature to an AD converter 14. The AD converter 14 AD-converts the temperature signal (analog signal) into temperature data (digital signal) and supplies the temperature data to the microcomputer 1.

The microcomputer 1 compares the temperature indicated by the temperature data with a target temperature and determines a driving amount of the Peltier device 26 (the Peltier device unit 20), so that a difference between the temperature indicated by the temperature data and the target temperature is small. The microcomputer 1 supplies control data that indicates the determined driving amount to the DA converter 15. The DA converter 15 DA-converts the control data (digital signal) into a control signal (analog signal) and supplies the control signal to the Peltier drive circuit 4. The Peltier drive circuit 4 receives predetermined power from the power supply 2. The Peltier drive circuit 4, as a DC-DC converter, drives the Peltier device 26 (the Peltier device unit 20) with the driving amount (driving power) indicated by the control signal, of the predetermined power received from the power supply 2. The microcomputer 1 thus feedback-controls the driving of the Peltier device 26 (the Peltier device unit 20) so that the temperature of the laser element 5 detected by the temperature detection circuit 13 becomes the target temperature.

Further, the microcomputer 1 monitors (always or regularly, for example) control data (current driving amount) of the DA converter 15, compares the data with an upper limit data value (maximum value of the driving amount), and calculates the rate of the current driving amount of the Peltier device 26 (the Peltier device unit 20) to the upper limit data value (maximum value of the driving amount). That is, the microcomputer 1 monitors "(current driving amount)/(maximum value of the driving amount)" as a Peltier driving rate (that is, a driving rate of the Peltier device 26 (the Peltier device unit 20)). The microcomputer 1 provides a threshold TH1 for the Peltier driving rate to indicate that the Peltier driving rate approaches its maximum value (100%). The microcomputer 1 controls the driving of the laser element 5 so that the light output of the laser element 5 is reduced when the Peltier driving rate exceeds the threshold TH1 (such as 95%). That is, the microcomputer 1 reduces the target light output of the laser element 5 and feedback-controls the driving of the laser element 5 so that the light output of the laser element 5 detected by the light-amount detection circuit 10 becomes the reduced target light output.

An operation of the image display device 100 according to the present embodiment is explained next. The image display device 100 shown in FIG. 1 is designed to be stabilized within a range of the Peltier driving rate of, for example, 0 to 90% when the laser element 5 is used at a temperature within a normal usage temperature range. When an ambient temperature is abnormally high, when the fan 29 or the radiator 28 is clogged because of accumulated dust, or when the device is arranged so that an air path from the fan 29 to the radiator 28 cannot be ensured, the amount of heat cooled by the Peltier device unit 20 can be reduced. That is, the cooling capacity of the Peltier device unit 20 is reduced and the temperature of the laser element 5 cannot be controlled to a target temperature. When the laser element 5 continues to be used at a high temperature beyond the target temperature, the life of the laser element 5 can be shortened significantly or the laser element 5 can be broken.

Figure 2:
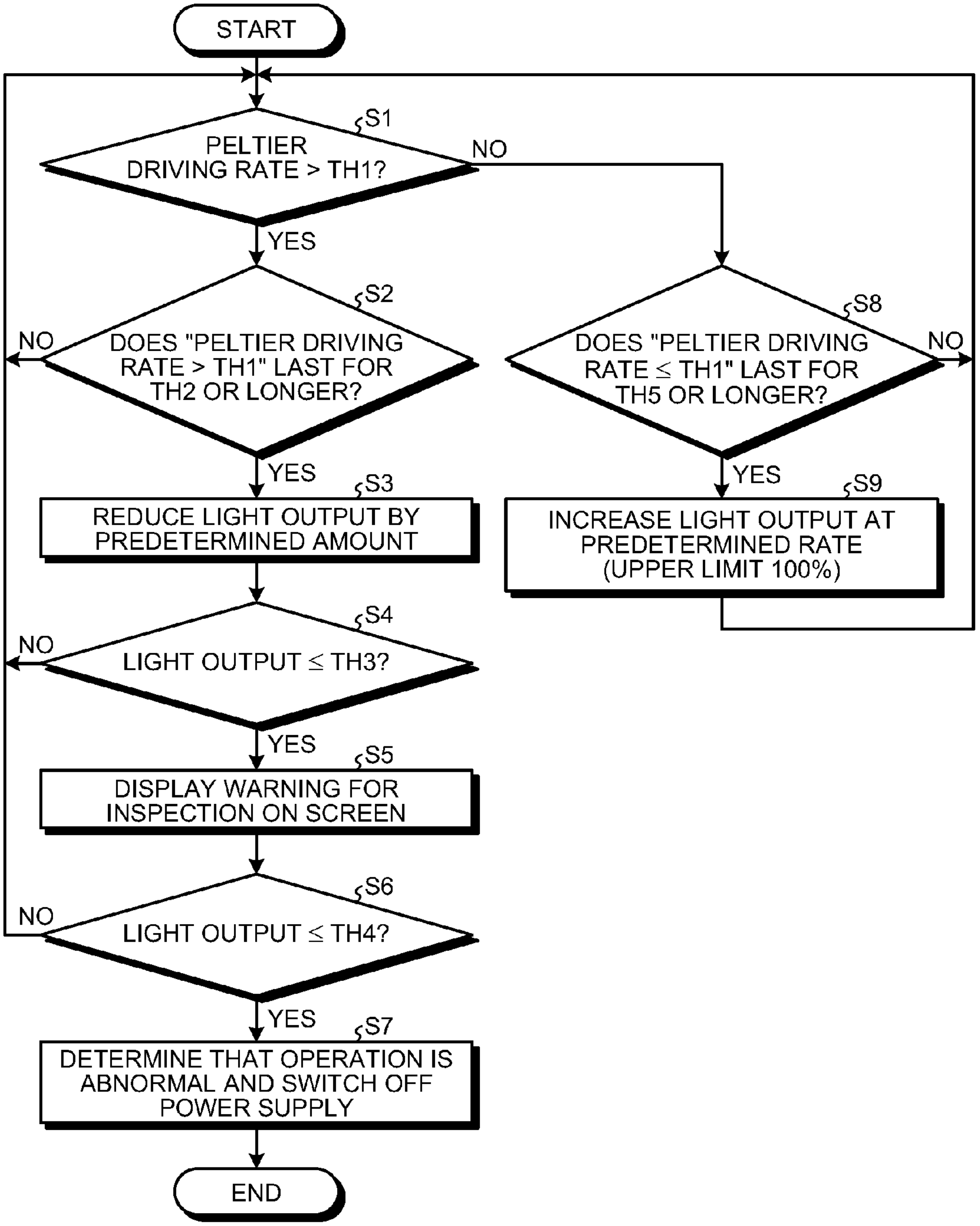
FIG. 2 is a flowchart of an operation of the image display device according to the embodiment.
Figure 3:
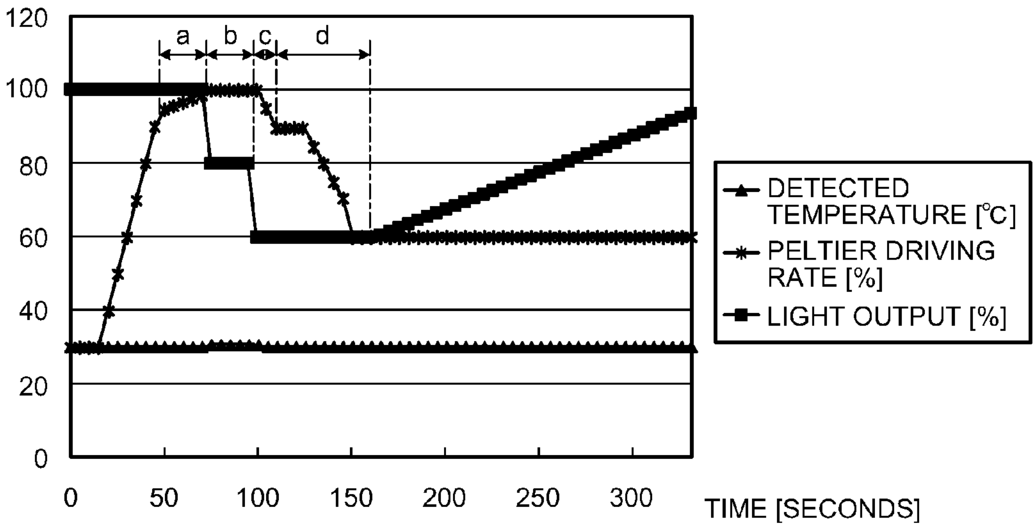
FIG. 3 depicts an operation of the image display device according to the embodiment.

To handle these problems, the image display device 100 according to the present embodiment performs operation as shown in FIGS. 2 and 3. These operations are specifically explained below.

At Step S1 shown in FIG. 2, the microcomputer 1 determines whether a Peltier driving rate exceeds the threshold TH1 (such as 95%). When the Peltier driving rate exceeds the threshold TH1, process of the microcomputer 1 proceeds to Step S2. When the Peltier driving rate does not exceed the threshold TH1, that is, when the Peltier driving rate is equal to or less than the threshold TH1, process of the microcomputer 1 proceeds to Step S8.

At Step S2, the microcomputer 1 counts a duration that the Peltier driving rate exceeds the threshold TH1 by a timer (not shown). When the duration is equal to or longer than a threshold TH2 (such as 20 seconds), that is, when a state that "Peltier driving rate>TH1" lasts for TH2 or longer (in a case of a period "a" in FIG. 3, for example), process of the microcomputer 1 proceeds to Step S3. When the duration is shorter than the threshold TH2, that is, when the state that "Peltier driving rate>TH1" lasts for a time less than TH2, the process of the microcomputer 1 returns to Step S1.

At Step S3, the microcomputer 1 controls the driving of the laser element 5 so that the light output of the laser element 5 is reduced by a predetermined amount. Specifically, the microcomputer 1 reduces the target light output of the laser element 5 by a predetermined amount (such as 20%) and feedback-controls the driving of the laser element 5 so that the light output of the laser element 5 detected by the light-amount detection circuit 10 becomes the reduced target light output.

For example, as shown in FIG. 3, because the period "a" that "Peltier driving rate>95%" is 20 seconds or longer, the microcomputer 1 reduces the target light output of the laser element 5 by 20%, that is, from 100% to 80%. The microcomputer 1 then controls the laser drive circuit 3 according to a detected value of the light-amount detection circuit 10. That is, the microcomputer 1 feedback-controls the driving of the laser element 5 by the laser drive circuit 3 so that the light output of the laser element 5 detected by the light-amount detection circuit 10 is 80%.

At Step S4 shown in FIG. 2, the microcomputer 1 determines whether the light output of the laser element 5 detected by the light-amount detection circuit 10 is reduced to be equal to or lower than a threshold TH3 (such as 60%). When it is determined that the light output of the laser element 5 is reduced to be equal to or lower than the threshold TH3 (in a case of a period "c" shown in FIG. 3, for example), process of the microcomputer 1 proceeds to Step S5. When it is determined that the light output of the laser element 5 is higher than the threshold TH3, the process returns to Step S1.

When the light output of the laser element 5 detected by the light-amount detection circuit 10 is higher than the threshold TH3, the processes of Steps S1 to S4 are repeated.

FIG. 3 depicts a case that the state that "Peltier driving rate>95%" lasts for 20 seconds or longer subsequent to the period "a" as a period "b". Because the period "b" is 20 seconds or longer, the microcomputer 1 reduces the target light output of the laser element 5 by 20%, that is, from 80% to 60%. The microcomputer 1 controls the laser drive circuit 3 according to the detected value of the light-amount detection circuit 10. That is, the microcomputer 1 feedback-controls the driving of the laser element 5 by the laser drive circuit

3 so that the light output of the laser element 5 detected by the light-amount detection circuit 10 is 60%.

At Step S5 shown in FIG. 2, the microcomputer 1 controls the image projection device 16 so that a warning, which indicates that an environmental temperature should be checked or an exhaust vent should be cleaned and inspected, is projected and displayed on the screen 17. The microcomputer 1 thus informs a user that an environmental temperature should be checked and an exhaust vent should be cleaned and inspected.

For example, as shown in FIG. 3, because "Peltier driving rate>95%" and the light output of the laser element 5 is equal to or lower than 60% in the period "c", the microcomputer 1 causes to project and display a warning indicating that an environmental temperature should be checked and an exhaust vent should be cleaned and inspected on the screen 17. A user checks the warning projected and displayed on the screen 17 and cleans, for example, the radiator 28 and the fan 29 in the Peltier device unit 20. When the cooling capacity of the Peltier device unit 20 is recovered, the Peltier driving rate is gradually reduced from 100% as shown in FIG. 3.

At Step S6, the microcomputer 1 determines whether the light output of the laser element 5 detected by the light-amount detection circuit 10 is equal to or lower than a threshold TH4 (such as 10%). When it is determined that the light output of the laser element 5 is equal to or lower than the threshold TH4, process of the microcomputer 1 proceeds to Step S7, and returns to Step S1 when it is determined that the light output of the laser element 5 is higher than the threshold TH4.

At Step S7, it is determined that an operation of reducing the light output of the laser element 5 is repeated even after a warning and the Peltier device unit 20 is in an abnormal state, and the microcomputer 1 switches the power supply 2 off and stops the output of the laser element 5.

On the other hand, at Step S8, the microcomputer 1 counts a duration that the Peltier driving rate is equal to or lower than the threshold TH1 by a timer (not shown). When the duration is longer than a threshold TH5 (such as 1 minute), that is, when the state that "Peltier driving rate≤TH1" lasts for TH5 or longer (in a case of a period "d" shown in FIG. 3, for example), process of the microcomputer 1 proceeds to Step S9. When the duration is shorter than the threshold TH5, that is, when the state that "Peltier driving rate>TH1" last for less than TH5, the process of the microcomputer 1 returns to Step S1.

At Step S9, the microcomputer 1 controls the driving of the laser element 5 so that the light output of the laser element 5 is increased at a predetermined rate. Specifically, the microcomputer 1 increases the target light output of the laser element 5 at a predetermined rate (at a fixed rate, for example) and feedback-controls the driving of the laser element 5 so that the light output of the laser element 5 detected by the light-amount detection circuit 10 becomes the increased target light output. With this configuration, the microcomputer 1 recovers (gradually, for example) the light output of the laser element 5.

For example, as shown in FIG. 3, because the period "d" in that "Peltier driving rate 95%" lasts for 1 minute or longer, the microcomputer 1 increases the target light output of the laser element 5 gradually (such as continuously or stepwise) from 60% at a fixed rate (for example, at a rate of 20%/100 seconds=0.5%/second). The microcomputer 1 controls the laser drive circuit 3 according to a detected value of the light-amount detection circuit 10. That is, every time the target light output is increased, the microcomputer 1 feedback-controls the driving of the laser element 5 by the laser drive circuit 3 so that the light output of the laser element 5 detected by the light-amount detection circuit 10 becomes the increased target light output.

A case that a temperature of a laser element is increased to a target temperature or higher and then a light output of the laser element is reduced or a power supply of a television set is switched off is examined. In this case, an "abnormality" can be detected only when the target temperature is exceeded. Further, when the heat capacity of a cooling device itself is large and once an abnormal temperature is reached, it takes a long time to reduce the temperature. Accordingly, a significantly large margin becomes necessary for the upper limit value of the operating temperature of the laser element.

On the other hand, in the present embodiment, when a state that a driving rate of the Peltier device unit is near its upper limit (a state of exceeding the threshold TH1) lasts for a certain period of time (for the threshold TH2 or longer), the target light output of the light-amount detection circuit 10 is reduced (gradually by 20%, for example). That is, when the cooling capacity of the Peltier device unit is reduced, the cooling load of the Peltier device unit can be also reduced accordingly. With this configuration, a temperature increase of the laser element 5 can be suppressed and the laser element 5 can be protected before the temperature of the laser element 5 becomes abnormal (the temperature exceeds the target temperature). That is, even when the cooling capacity of the Peltier device unit is reduced, the temperature of the laser element can be controlled to be the target temperature. As a result, a significant deterioration in the life of the laser element 5 and failures of the laser element 5 can be prevented.

Further, when the output is reduced to some extent, such as to 60%, a warning such that an exhaust vent and a vacuum vent should be checked is displayed on a screen for a user. With this configuration, a user can be urged to improve the usage environment to be appropriate. An increase in the temperature of the laser element 5 can be suppressed before the temperature of the laser element 5 becomes abnormal (the temperature exceeds the target temperature).

There is examined another case, that is, the cooling capacity of the Peltier device unit reaches its limit and the light output of the laser element is reduced, and then an outside temperature and the temperature of a cooling unit are detected. It is then determined whether the environment is changed and thus the Peltier device unit has enough cooling capacity. In this case, because time changes in the outside temperature and the temperature of the cooling unit are slow, the Peltier device unit cannot be recovered immediately. When the temperature is tried to be reduced in a short time, there is a problem in that the driving power supplied to the Peltier device unit becomes larger than needed (a value near the maximum value).

On the other hand, in the present embodiment, when a duration of the state that the driving rate of the Peltier device unit is equal to or lower than a certain driving rate (the threshold TH1) lasts for the threshold TH5 or longer, the light output of the laser element is gradually increased. When the environment changes and thus the cooling capacity of the Peltier device unit becomes enough, the output light amount of the Peltier device unit can be recovered to its original one automatically and immediately. That is, the Peltier device unit can be recovered immediately. Further, the driving power (driving amount) supplied to the Peltier device unit is monitored and the light output of the laser element is reduced before the supplied driving power reaches its maximum value. Accordingly, even when the temperature is tried to be reduced in a short time, a case that the driving power supplied to the Peltier device unit becomes larger than needed (a value near the maximum value) can be avoided.

According to the present invention, when the cooling capacity of the Peltier device unit is reduced, the cooling load of the Peltier device unit can be reduced accordingly. With this configuration, when the cooling capacity of the Peltier device unit is reduced, the temperature of the laser element can be controlled to be the target temperature.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image display device comprising:

a laser element that generates light for projecting and displaying an image on a display screen;

a Peltier device unit that cools the laser element;

a detecting unit that detects a temperature of the laser element; and a control unit that controls driving of the Peltier device unit so that a temperature detected by the detecting unit becomes a target temperature, wherein the control unit controls driving of the laser element to reduce a light output of the laser element when a driving rate of the Peltier device unit exceeds a threshold that indicates that the driving rate approaches a maximum value; and wherein the control unit controls the driving of the laser element to increase a light output of the laser element when a duration of a state, in which a driving rate of the Peltier device unit becomes lower than the threshold, is longer than a second threshold.

2. The image display device according to claim 1, further comprising:

a second detecting unit that detects a light output of the laser element; and a projection display unit that receives light output from the laser element to project and display an image on the display screen, wherein the control unit controls the projection display unit to project and display a warning on the display screen when a light output detected by the second detecting unit becomes lower than a third threshold.

* * * * *